(12) United States Patent
Hanes et al.

(10) Patent No.: US 9,731,804 B1
(45) Date of Patent: Aug. 15, 2017

(54) DIRECTLY MOUNTED SHAFT ACTUATOR

(71) Applicant: Brunswick Corporation, Lake Forest, IL (US)

(72) Inventors: Theodore J. Hanes, Fond du Lac, WI (US); Jeffrey J. Andrews, Fond du Lac, WI (US); Steven J. Gonring, Slinger, WI (US)

(73) Assignee: Brunswick Corporation, Lake Forest, IL (US)

( * ) Notice: Subject to any disclaimer, the term of this patent is extended or adjusted under 35 U.S.C. 154(b) by 93 days.

(21) Appl. No.: 14/627,323

(22) Filed: Feb. 20, 2015

(51) Int. Cl.
*B63H 20/20* (2006.01)
*F16H 37/12* (2006.01)
*F16H 3/14* (2006.01)

(52) U.S. Cl.
CPC .......... *B63H 20/20* (2013.01); *F16H 37/122* (2013.01); *F16H 3/145* (2013.01)

(58) Field of Classification Search
CPC ......... B63H 20/14; B63H 20/20; F16H 1/225; F16H 1/206; F16H 3/145
See application file for complete search history.

(56) References Cited

U.S. PATENT DOCUMENTS

| | | |
|---|---|---|
| 3,608,684 A | 9/1971 | Shimanckas |
| 3,994,254 A | 11/1976 | Woodfill |
| 4,173,939 A | 11/1979 | Strang |
| 4,223,773 A | 9/1980 | Croisant et al. |
| 4,302,196 A | 11/1981 | Blanchard |
| 4,323,354 A | 4/1982 | Blanchard |
| 4,331,432 A | 5/1982 | Blanchard |
| 4,343,612 A | 8/1982 | Blanchard |
| 4,986,774 A | 1/1991 | Wantz |
| 5,449,306 A | 9/1995 | Nakayasu et al. |
| 5,494,466 A | 2/1996 | Vernea |
| 6,112,873 A | 9/2000 | Prasse et al. |
| 6,544,083 B1 | 4/2003 | Sawyer et al. |
| 6,905,382 B2 | 6/2005 | Ochiai et al. |
| 6,929,518 B1 | 8/2005 | Sawyer et al. |
| 6,960,107 B1 | 11/2005 | Schaub et al. |
| 7,419,413 B2 * | 9/2008 | Mizuguchi ............ B63H 20/20 440/84 |
| 7,435,146 B2 * | 10/2008 | Oguma ................ B63H 20/20 440/75 |

(Continued)

*Primary Examiner* — Andrew Polay
(74) *Attorney, Agent, or Firm* — Andrus Intellectual Property Law LLP

(57) ABSTRACT

In one embodiment, an outboard marine engine comprises the internal combustion engine and a propulsor that is driven into rotation by the internal combustion engine so as to effect a thrust. The outboard marine engine further includes a transmission that shifts amongst a fourth gear wherein the thrust is forward thrust, a reverse gear wherein the thrust is a reverse thrust, and a neutral gear wherein the thrust is a zero thrust. The outboard marine engine further includes a shift rod that is rotatable about its own axis, wherein rotation of the shift rod about its own axis shifts the transmission amongst the forward gear, the reverse gear, and the neutral gear. An actuator operably connects to the internal combustion engine and causes rotation of a gear shaft. At least one gearset connects the gear shaft to the shift rod such that rotation of the gear shaft about its own axis rotates the shift rod about its own axis.

13 Claims, 6 Drawing Sheets

(56) References Cited

U.S. PATENT DOCUMENTS

| | | |
|---|---|---|
| 7,470,162 B2 | 12/2008 | Miyashita et al. |
| 7,891,263 B2 | 2/2011 | Mowbray et al. |
| 8,303,359 B2 | 11/2012 | Matsuda et al. |
| 2005/0014427 A1 | 1/2005 | Yoda et al. |
| 2007/0125192 A1 | 6/2007 | Mowbray et al. |
| 2014/0045393 A1 | 2/2014 | Kuriyagawa et al. |

\* cited by examiner

DIRECTLY MOUNTED SHAFT ACTUATOR

FIELD

The present disclosure relates to marine drive systems, and especially systems and apparatuses for shift actuation therein.

BACKGROUND

U.S. Pat. No. 3,608,684 describes a clutch for a marine propulsion device. The device affords reverse operation by rotation of the driveshaft housing about a vertical axis. It includes a clutch in the lower unit gear case for selectively engaging or disengaging the propeller shaft with the driveshaft. The clutch is responsive to axial movement of the driveshaft caused by moving a control handle accessible to the operator.

U.S. Pat. No. 3,994,254 discloses a multiple-speed transmission for coupling an engine to the impeller of a marine jet drive, such that an overdrive connection powers the jet drive under operating conditions up to a predetermined upper limit of cruising speeds and such that a reduced drive, for example a direct-drive connection, is automatically established for jet-drive speeds in excess of the cruising conditions.

U.S. Pat. No. 4,173,939 discloses a marine propulsion device that incorporates a two-speed transmission including a first drive gear which is mounted for common rotation with an input shaft drivingly connected to an engine and which meshes with a first driven gear mounted for rotation coaxially with a drive shaft drivingly connected to the propeller shaft and further including a second drive gear which is mounted for rotation coaxially with and independently of the input shaft and which meshes with a second driven gear mounted for common rotation with the drive shaft.

U.S. Pat. No. 4,223,773 discloses a drive engaging apparatus. A clutch apparatus for a marine drive lower gear case includes a propeller shaft rotatably mounted in a gear case housing. A drive gear for both forward and reverse is positioned in the housing coaxial with the propeller shaft and a clutch member is rotatably fixed on the propeller shaft and movable axially into drive engagement with the drive gear. Clutch engaging elements are provided on opposed portions of the drive gears and the clutch member. Shift means utilizing a positive acting cam means positively move the clutch member into and out of engagement from the drive gears. The shift means also include a releasable latch means to positively maintain the shift means in the engaged position and a preloading means between the shift means and the clutch member to snap the clutch member into engagement.

U.S. Pat. No. 4,302,196 describes a marine propulsion unit including propeller shaft thrust transmitting means. The marine propulsion device includes a driveshaft housing mounted for vertical swinging movement about a horizontal axis relative to a boat, a propeller shaft rotatably mounted in the driveshaft housing and having an axis of rotation, and a propeller carried by the propeller shaft. The marine propulsion device also includes a first bevel gear mounted in the driveshaft housing and in coaxial relation to the propeller shaft, a second bevel gear mounted in the driveshaft housing and in coaxial relation to the propeller shaft, and a clutch mechanism for selectively drivingly connecting the bevel gears to the propeller shaft.

U.S. Pat. No. 4,323,354 discloses a marine propulsion device that includes an input shaft drivingly connected to a power source, a lower unit having a rotatably mounted drive shaft extending in coaxial relation to the input shaft, and a propeller shaft rotatably mounted in the lower unit, the propeller shaft carrying a propeller. A two-speed transmission is provided to drivingly connect the input shaft to the drive shaft.

U.S. Pat. No. 4,331,432 discloses a marine propulsion device that includes an input shaft drivingly connected to a power source, a lower unit having a rotatably mounted drive shaft extending in coaxial relation to the input shaft, a rotatably mounted propeller shaft carrying a propeller and drivingly connected to the propeller shaft, and a two-speed transmission drivingly connecting the input shaft to the drive shaft.

U.S. Pat. No. 4,343,612 discloses an outboard motor that includes a power head having an engine, a propulsion leg extending downwardly from the power head, an input shaft housed in the propulsion leg and driven by the engine, a drive shaft housed in the propulsion leg, a propeller shaft in the propulsion leg and drivingly connected to the drive shaft, and a propeller mounted on the propeller shaft.

U.S. Pat. No. 4,986,774 discloses a desmodromic shift adaptor for a counter-rotating propeller shaft assembly. The adaptor member accommodates use of a desmodromic cam-actuated shifting mechanism. The adaptor member includes a cup, which is adapted to mount the fore one of the forward and reverse gears through a bearing member. The adaptor member further includes an internal passage within which is disposed the movable cam of the shifting mechanism, and an opening is in communication with the passage for allowing connection of the shift shaft to the shifting cam after assembly of the adapter member into the gear case cavity.

U.S. Pat. No. 5,449,306 describes a shifting mechanism for an outboard drive. It provides reduced coupling shock when the forward gears are engaged by a dual clutch assembly, as well as providing for consistent and quick engagement of the clutch assembly with the gear. The shifting mechanism involves a first gear and a corresponding first clutch, and a second gear and a corresponding second clutch. A plunger carries the first and second clutches which are arranged on the plunger at unequal distances from their respective gears.

U.S. Pat. No. 5,494,466 discloses a transmission for a single engine drive for dual concentric propellers in a straight or V-drive arrangement with the straight-drive including four shafts and nine gears and the V-drive adding two more shafts and four more gears.

U.S. Pat. No. 6,112,873 describes an anti-backlash dog type clutch. The clutch is provided for mounting on a rotatable shaft. The drive clutch includes a drive gear having a plurality of gear teeth projecting therefrom. A sleeve is slidably mounted on the shaft for rotational movement therewith. The sleeve includes a plurality of gear engaging recesses therein of arcuate lengths greater than the predetermined arcuate lengths of the gear teeth. The sleeve is movable between a first retracted position and a second engaged position wherein the gear teeth are received within corresponding gear engagement recesses in the sleeve in order to translate rotation of the drive gear to the shaft. A plurality of anti-backlash elements are provided to compensate for the difference in the arcuate lengths of the gear teeth and their corresponding gear engagement recesses in the sleeve.

U.S. Pat. No. 6,544,083 discloses a shift mechanism for a marine propulsion system. The mechanism is provided in which a cam structure comprises a protrusion that is shaped to extend into a channel formed in a cam follower structure.

The cam follower structure can be provided with first and second channels that allow the protrusion of the cam to be extended into either channel which accommodates both port and starboard shifting mechanisms. The cam surface formed on the protrusion of the cam moves in contact with a selected cam follower surface formed in the selected one of two alternative channels to cause the cam follower to move axially and to cause a clutch member to engage with either a first or second drive gear.

U.S. Pat. No. 6,905,382 discloses a shift mechanism has a shift unit movable between a first shift position and a second shift position. The transmission moves to a first position while the shift unit moves toward the first shift position, and moves to a second position while the shift unit moves toward the second shift position. An electrically operable shift actuator is supported by the drive body. The shift actuator has an actuating member that preferably is detachably coupled with the shift unit.

U.S. Pat. No. 6,929,518 discloses a shifting apparatus for a propulsion device that incorporates a magneto-elastic elastic sensor which responds to torque exerted on the shift shaft of the gear shift mechanism. The torque on the shift shaft induces stress which changes the magnetic characteristics of the shift shaft material and, in turn, allows the magnetoelastic sensor to provide appropriate output signals representative of the torque exerted on the shift shaft. This allows a microprocessor to respond to the onset of a shifting procedure rather than having to wait for actual physical movement of the components of the shifting device.

U.S. Pat. No. 6,960,107 discloses a marine transmission with a cone clutch used for direct transfer of torque. A transmission for a marine propulsion system uses a cone clutch in such a way that, when in a forward gear position, torque is transmitted from the input shaft, or driving shaft, to an output shaft, or driven shaft, solely through the cone clutch. When in forward gear position, driving torque between the driving and driven shafts is not transmitted through any gear teeth. When in reverse gear position, torque is transmitted through an assembly of bevel gears.

U.S. Pat. No. 7,470,162 discloses a shift system for outboard motors, which was reduced in size and is capable of securing capability with an outboard motor of a type for which the shift operation is manually performing using a shift cable. A motor-driven shift actuator is disposed at a location forward of and to the right of an engine within. A clutch motor is provided for the actuator and disposed at a location rearward thereof, with a motor output shaft disposed in a manner extending forward, and is operated in response to the detected vessel operator's shift. An actuator output shaft is disposed at a location forward of the clutch motor and extends downward from a front part of the actuator. The actuator output shaft rotates in accordance with rotation of the motor output shaft. A clutch shaft is disposed below the actuator and rearward of the actuator output shaft. A first linkage is disposed on the right side of the actuator, as viewed in plan view, and connects between the actuator output shaft and the clutch shaft.

U.S. Pat. No. 7,891,263 discloses a shifting mechanism for an outboard drive of a watercraft. The shifting mechanism is located on a drive train generally aligned along a vertical axis and above a propulsion shaft of the lower unit. The drive train includes a rotatable input shaft which is driven by a motor.

U.S. Pat. No. 8,303,359 discloses an outboard motor that includes a transmission mechanism mounted between an output shaft of an engine and a propeller drive shaft. The transmission mechanism includes a clutch.

U.S. Patent Application Publication No. 2005/0014427 discloses a shift operation apparatus for an outboard motor comprising a worm gear which is rotated by the motor, a worm wheel that engages with the worm gear, an output shaft provided so as to freely rotate, a gear mechanism which transmits rotation of the worm wheel to the output shaft, an output arm which is attached to the output shaft, and which moves a range from a shift forward position to a shift reverse position with a neutral position being a boundary, a sensor which outputs a signal relating to a shift position of the output arm to a control circuit, and a force transmitting member whose one end is connected to the output arm, and whose other end is connected to a portion to be operated of a shift mechanism.

U.S. Patent Application Publication No. 2007/0125192 discloses a two speed transmission that includes an input shaft; a layshaft spaced from the input shaft; a first gear train connecting the input shaft to the layshaft; a second gear train connecting the layshaft to an output shaft the gear train including a one way clutch or similar; and a clutch for engaging the input shaft with the output shaft. The transmission is arranged such that when the output shaft is disengaged from the input shaft power is transmitted to the output shaft via the first and second gear trains and the layshaft.

U.S. Patent Application Publication No. 2014/0045393 discloses an outboard motor that is mounted on a stern of a boat and provided with a transmission and an oil pump. The transmission has a first-speed and second-speed gears, a first-speed gear clutch made of a mechanical dog clutch and a second-speed gear clutch made of a hydraulic clutch each adapted to engage the first and second-speed gears on a power transmission shaft, and a first-speed gear shift actuator adapted to couple the first-speed gear clutch with the first-speed gear. In the transmission, a first speed is established when the first-speed gear is engaged on the power transmission shaft and a second speed is established when the second-speed gear is engaged on the power transmission shaft while the first speed has been established such that power of the engine is transmitted to the propeller through the established speed.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present disclosure arose during continuing research and development of systems and apparatuses for shift actuation in marine drives. In certain examples, an outboard marine engine comprises an internal combustion engine and a propulsor that is driven into rotation by the internal combustion engine so as to effect a thrust. The outboard marine engine further includes a transmission that shifts amongst a forward gear wherein the thrust is forward thrust, a reverse gear wherein the thrust is a reverse thrust, and a neutral gear wherein the thrust is a zero thrust. The outboard marine engine further includes a shift rod that is rotatable about its own axis, wherein rotation of the shift rod about its own axis shifts the transmission amongst the forward gear, the reverse gear, and the neutral gear. An actuator operably connects to the internal combustion engine and causes rotation of a gear shaft. At least one gearset connects the gear shaft to the shift rod such that rotation of the gear shaft about its own axis rotates the shift rod about its own axis.

One embodiment of a shift actuation system for a marine drive comprises an actuator that causes rotation of a gear shaft, the gear shaft on the first axis, and a transmission that shifts amongst a forward gear wherein the thrust is a forward thrust, a reverse gear wherein the thrust is reverse thrust, and a neutral gear wherein the thrust is a zero thrust. A shift rod is on a second axis and is rotatable to shift the transmission amongst the forward gear, the reverse gear, and the neutral gear, wherein the second axis is perpendicular to the first axis. The shift rod is spaced apart from the gear shaft along the third axis that is perpendicular to the first axis and the second axis. At least one gearset connects the gear shaft to the shift rod such that rotation of the gear shaft about the first axis rotates the shift rod about the second axis.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
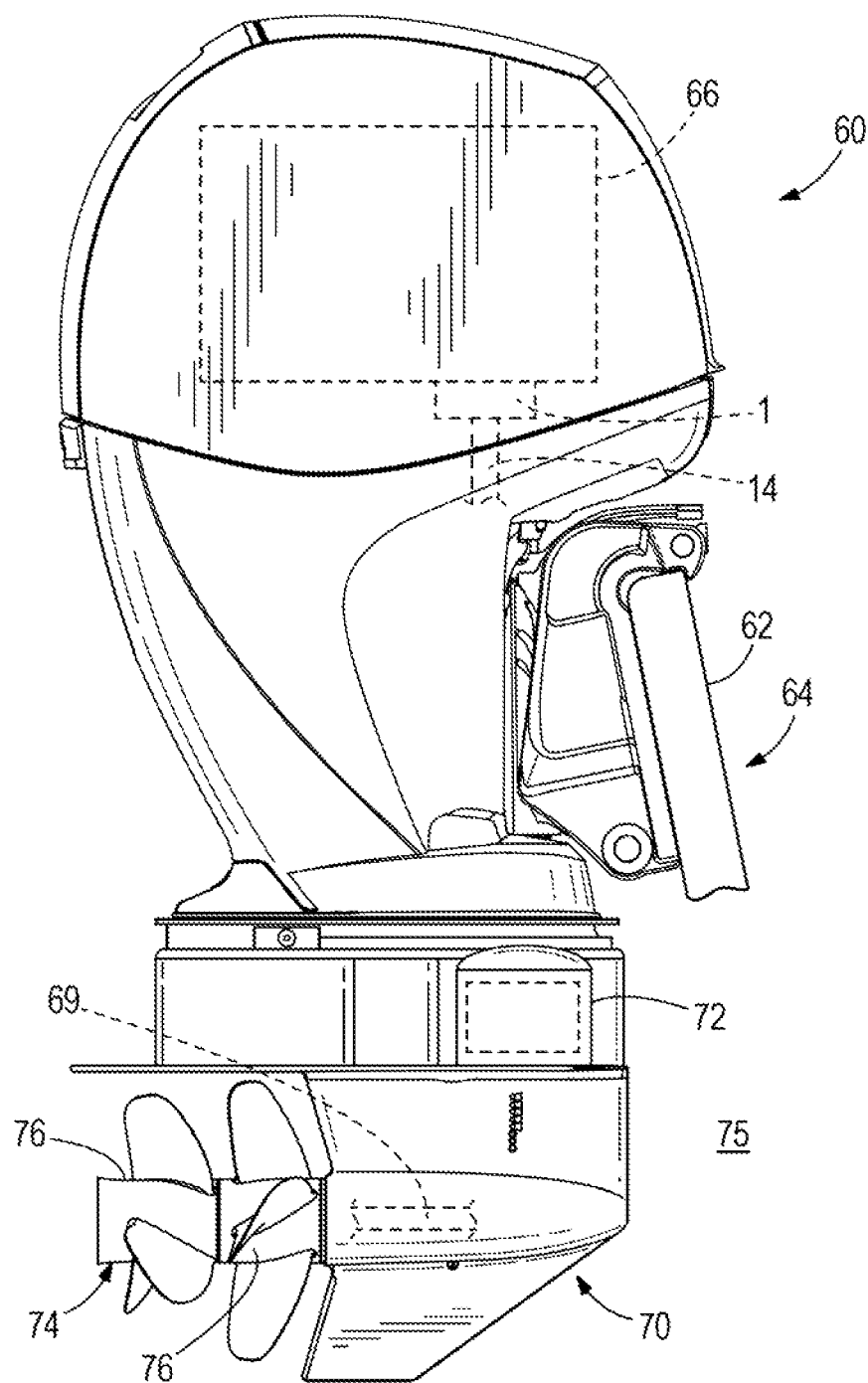
FIG. 1 is a side view of an outboard marine engine coupled to a marine vessel.

FIG. 1 depicts an outboard marine engine connected to a transom 62 of a marine vessel 64. The outboard marine engine 60 has an internal combustion engine 66 that causes rotation of a driveshaft. Rotation of the driveshaft is transferred via transmission 72 to a propulsor shaft 69 located in gear case housing 70. The transmission 72 is operable in Forward, Neutral, and Reverse gears. Rotation of a propulsor shaft 69 in Forward and Reverse gears causes forward and reverse rotation of a propulsor 74, respectively. In this example, the propulsor 74 includes counter rotating propellers 76. In alternate embodiments, the propulsor 74 can include single propellers, more than two propellers, one or more impellers, and/or any other similar devices for creating thrust force in water 75 to propel marine vessel 64.

FIG. 1 depicts an outboard marine engine 60 configured in accordance with certain features, aspects, and advantages of the present invention. The outboard marine engine 60 is one type of marine drive, and the embodiments below are described in the context of an outboard marine engine. The embodiments, however, can be applied to other marine drives, such as inboard drives and inboard/outboard drives (or stern drives), as will be apparent to those of ordinary skill in the art.

Figure 2:
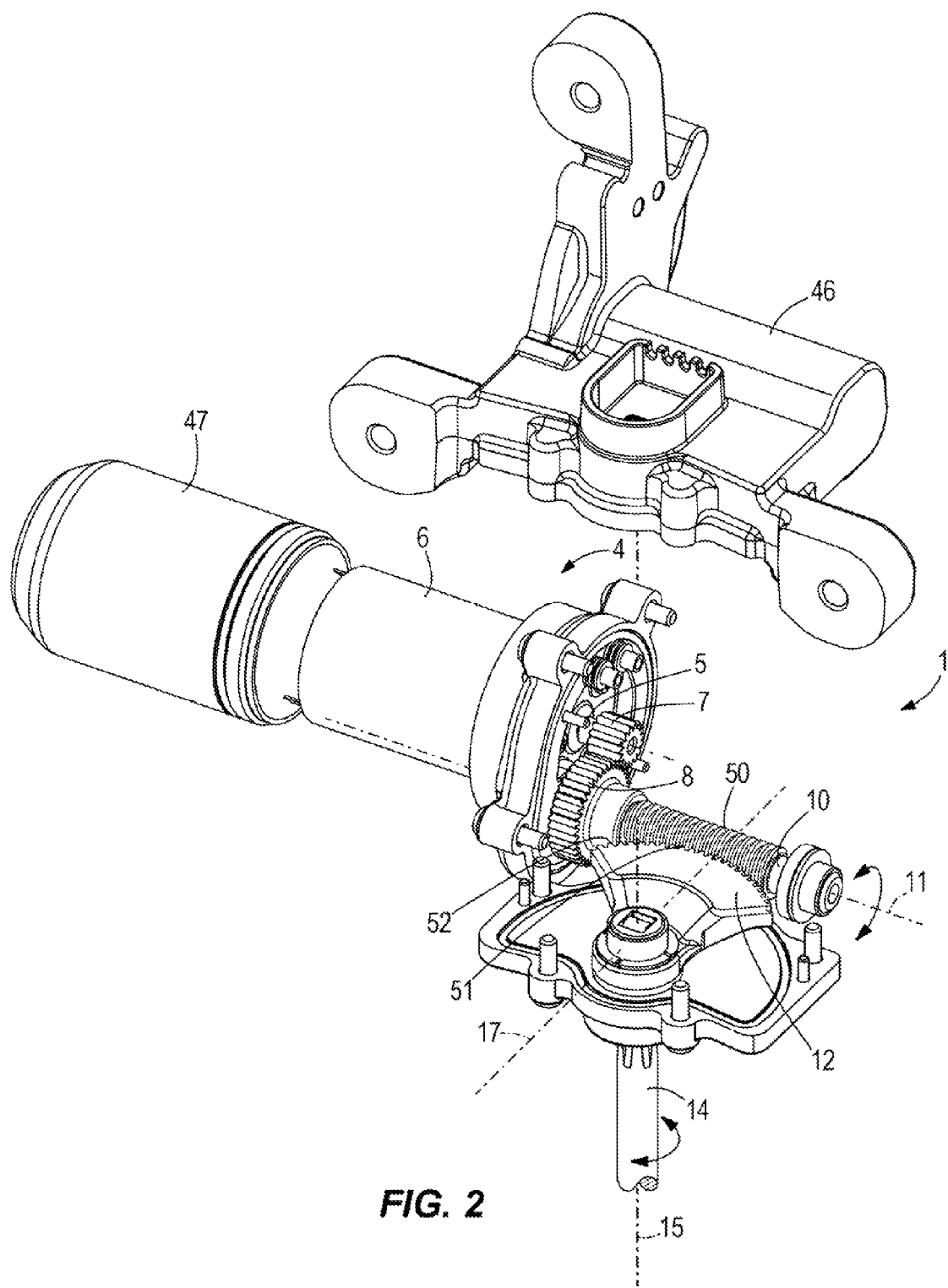
FIG. 2 depicts one embodiment of a shift actuation system for a marine drive.

FIG. 2 depicts one embodiment of a shift actuation system 1. The shift actuation system 1 operably connects to the internal combustion engine 66 and may be housed in housing 46, which mounts within the outboard marine engine 60. The shift actuation system 1 may be located within the engine compartment and attached to the engine. Alternatively or additionally, brackets or adapters may provide operable connection between the internal combustion engine 66 and the shift actuation system 1. Thus, in some embodiments the shift actuation system 1, or parts thereof, may be located outside of the engine compartment. An actuator 4 has a motor 6 that causes rotation of gear shaft 10. Motor 6 may be any motor capable of rotating a shaft as described herein, such as an electric motor or air motor. The motor may be protected by a cover 47. In the embodiment of FIG. 2, motor 6 rotates output shaft 5 in order to effectuate rotation of gear shaft 10. Output shaft 5 is connected through a gearset, including a first gear 7 and a second gear 8, to gear shaft 10. The first gear 7 is fixed to output shaft 5 and the second gear 8 is connected to the gear shaft 10. Rotation of the first gear 7 by the output shaft 5 transfers rotational movement to the second gear 8 and causes rotation of the gear shaft 10. Rotation of the output shaft 5 in one rotational direction causes rotation of the gear shaft 10 in an opposite rotational direction. The first gear 7 and the second gear 8 are depicted in FIG. 2 as parallel axis spur gears. In other embodiments, the first gear 7 and the second gear 8 may be, for example, helical gears, bevel gears, or hypoid gears, and may have parallel or crossed axes. Likewise, the gearset connecting the output shaft 5 and the gear shaft 10 may comprise any number of gears.

Gear shaft 10 is positioned along a first axis 11 and rotates about that axis. Shift rod 14 is positioned along a second axis 15 and rotates about that axis. Gear shaft 10 is connected to shift rod 14 through a gearset such that rotation of gear shaft 10 causes rotation of shift rod 14. In the embodiment of FIG. 2, gear shaft 10 has worm 50 that engages sector gear 12, which is fixed to shift rod 14. Sector gear 12 has an arched surface 51. The arched surface 51 has teeth 52 thereon that mesh with the grooves in worm 50 such that rotation of the gear shaft 10 and worm 50 forces the sector gear 12 to rotate. Sector gear 12 is fixed to shift rod 14, which is rotatable about its own axis 15. Rotation of the shift rod 14 shifts the transmission amongst a forward gear, a reverse gear, and a neutral gear. The shift rod 14 extends along a second axis 15 which runs perpendicular to the first axis 11. The shift rod 14 is spaced apart from the gear shaft 10 along a third axis 17. In this embodiment, the third axis 17, and thus the shift rod 14, is perpendicular to both the second axis 15 and the first axis 11.

Figure 3:
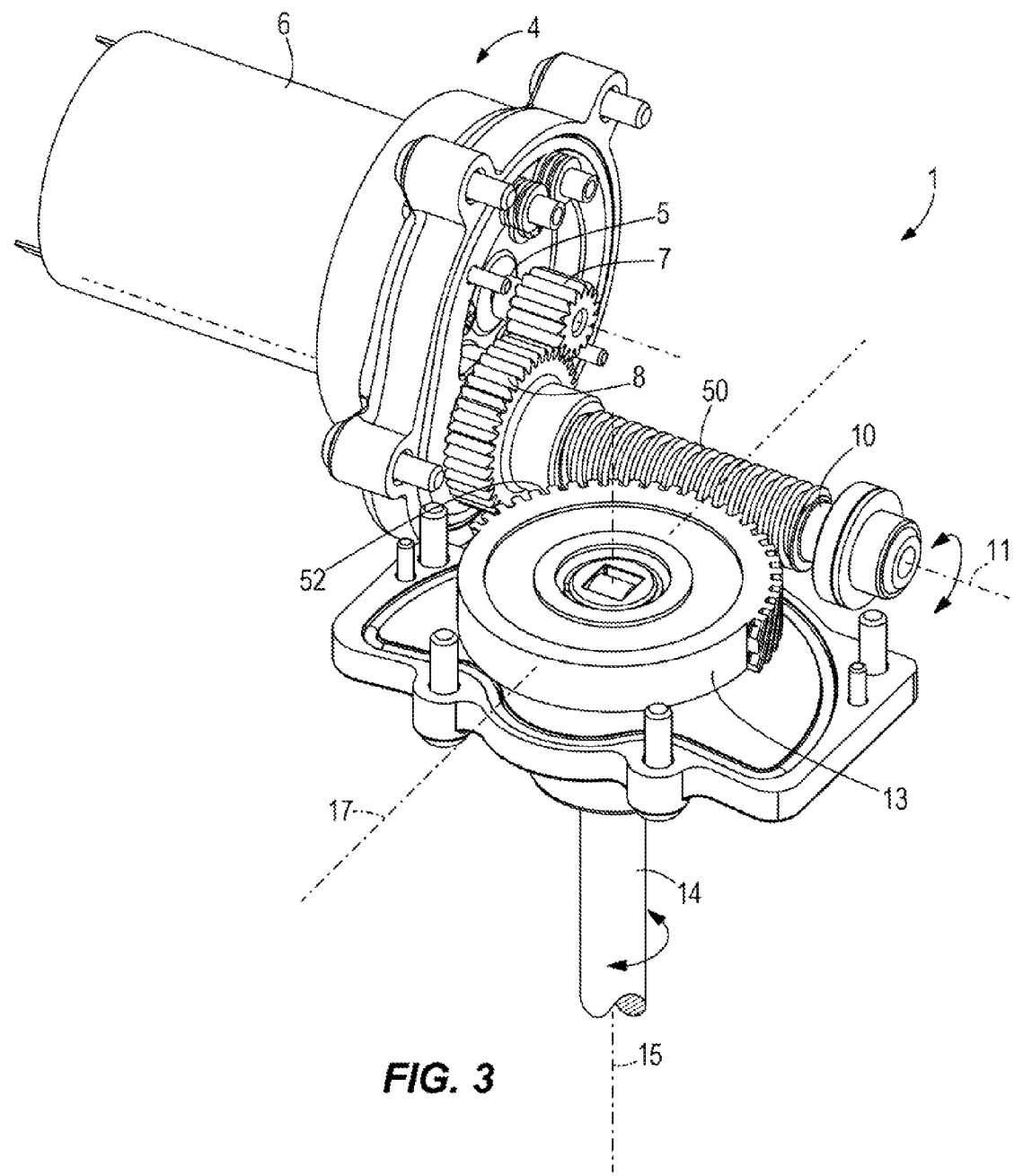
FIG. 3 depicts another embodiment of a shift actuation system for a marine drive.

FIG. 3 depicts another embodiment of the shift actuation system 1 that is similar to the embodiment of FIG. 2 except that a worm gear 13, or worm wheel, is fixed to the shift rod 14 instead of sector gear 12. The worm gear 13 has teeth 52 that mesh with the worm 50 to transfer rotational motion from the gear shaft 10 to the shift rod 14. Worm gear 13 may be any type of gear configuration capable of meshing with worm 50, including but not limited to a spur gear or helical gear configuration. Like the embodiment of FIG. 2, the shift rod 14 is oriented along third axis 17 and extends perpendicular to the gear shaft 10.

Figure 4:
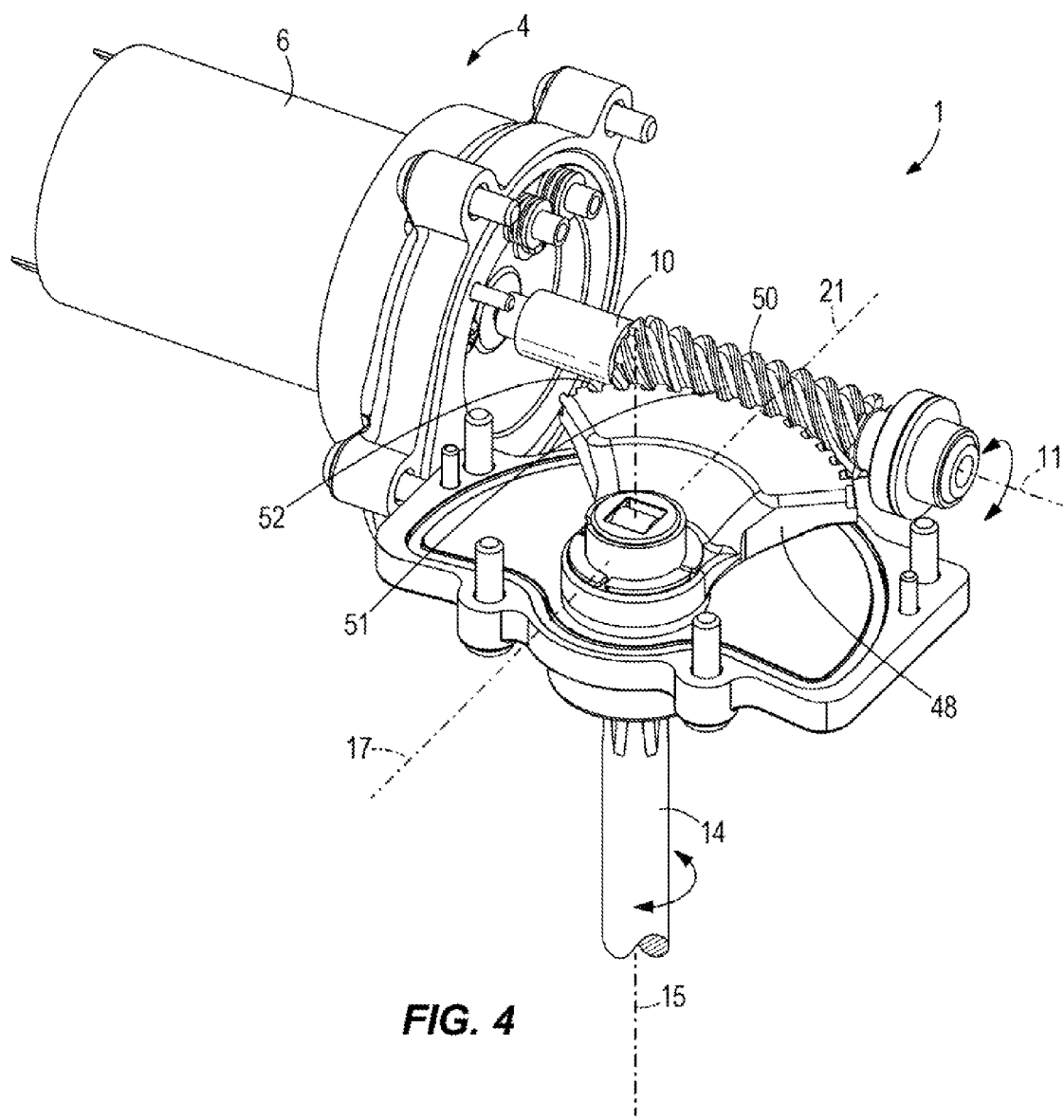
FIG. 4 depicts another embodiment of a shift actuation system for a marine drive.

FIG. 4 depicts another embodiment of a shift actuation system 1. In this embodiment, gear shaft 10 connects directly to motor 6 of actuator 4 such that the motor 6 acts directly on the gear shaft 10 causing it to rotate about its own axis, which is first axis 11. Similar to the embodiments of FIGS. 2 and 3, the gear shaft 10 has a worm 50 that engages a gear 48 fixed to the shift rod 14 such that rotation of the gear shaft 10 about first axis 11 causes rotation of shift rod 14 about second axis 15. Similar to the above-described embodiments, here the shift rod 14 extends perpendicularly to the gear shaft 10. The gear 48 may be, for example, a sector gear or a worm gear as described with respect to the embodiments above. The gear 48 has teeth 52 that mesh with the threading on the worm 50 to transmit rotational motion.

Figure 5:
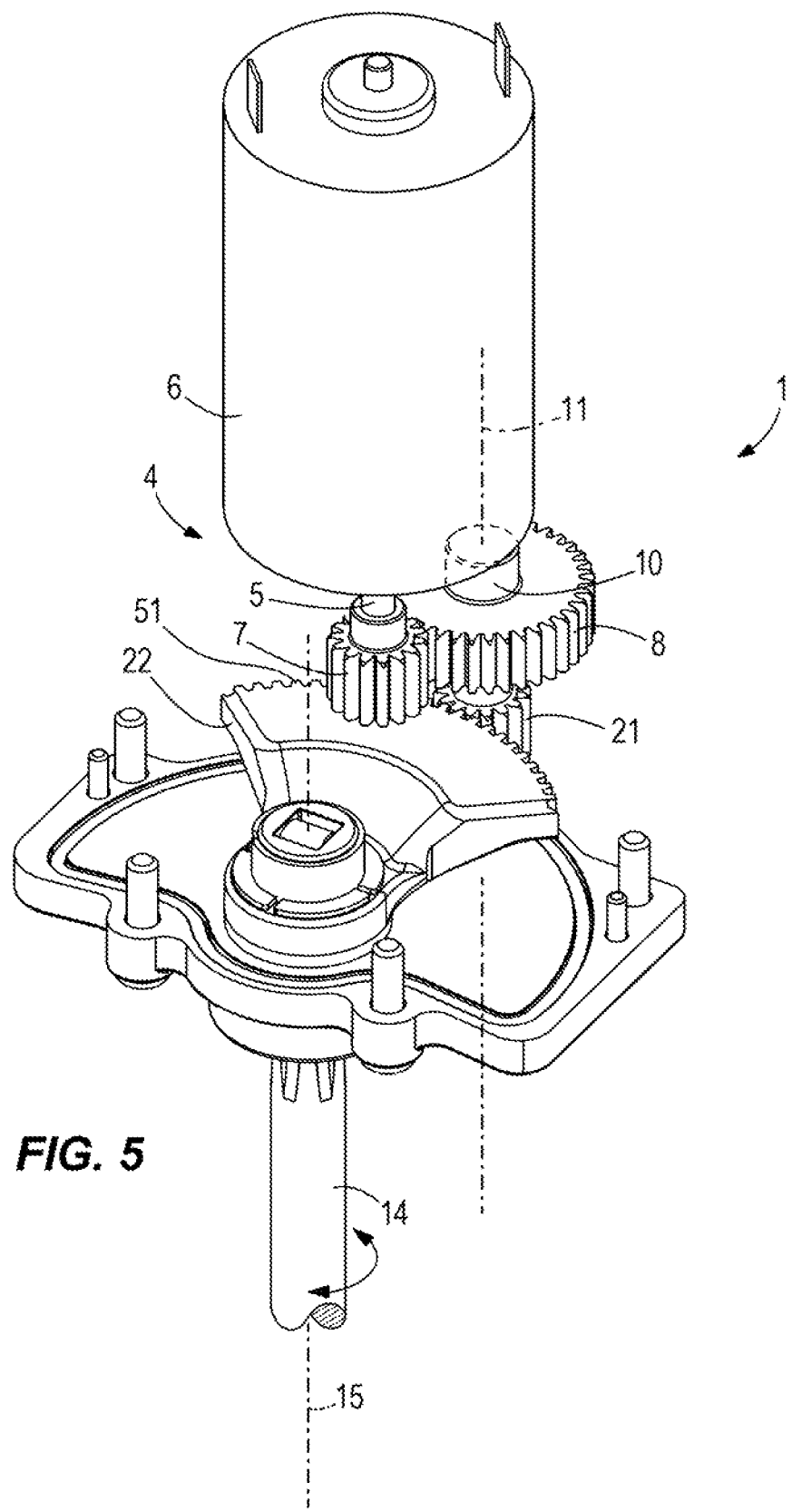
FIG. 5 depicts another embodiment of a shift actuation system for a marine drive.

In FIG. 5, an embodiment of a shift actuation system 1 has shift rod 14 that is parallel to gear shaft 10. More specifically, gear shaft 10 extends along first axis 11, which is parallel to axis 15 of the shift rod 14. The gear shaft 10 and the shift rod 14 are connected by a gearset comprising at least a third gear 21 fixed to the gear shaft 10 and a fourth gear 22 fixed to the shift rod 14. The output shaft 5 is connected to the gear shaft 10 by a gearset comprising first gear 7 and second gear 8, as is described above. The third gear 21 and the fourth gear 22 are parallel axis gears and may be, for example, spur gears or helical gears. The axes of third gear 21 and the fourth gear 22 also run parallel with the axes of the first gear 7 and the second gear 8. Furthermore, the third gear 21 and fourth gear 22 may be circular gears or sector gears.

Figure 6:
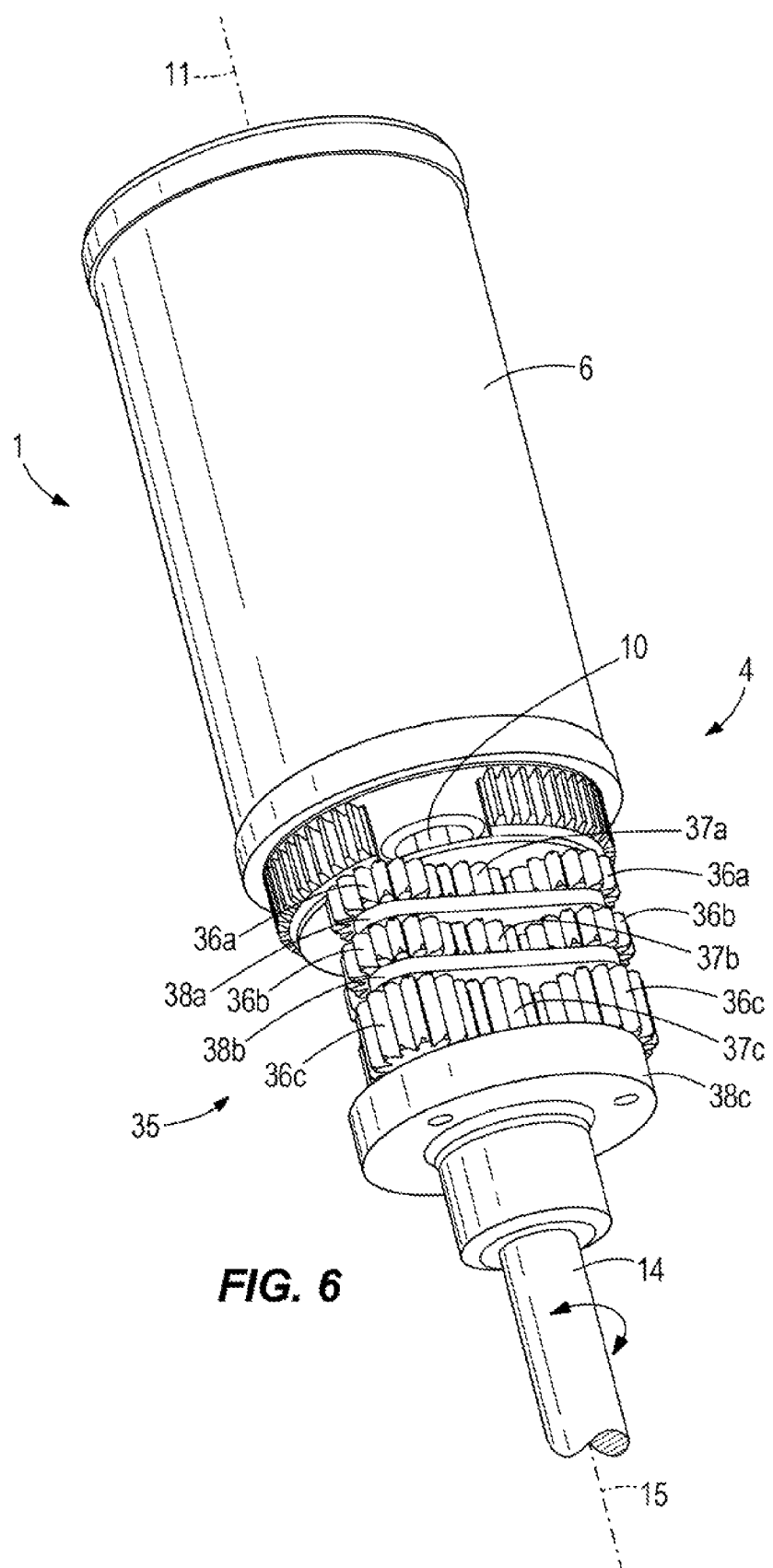
FIG. 6 depicts another embodiment of a shift actuation system for a marine drive.

In FIG. 6, an embodiment of a shift actuation system 1 has a shift rod 14 that is parallel to gear shaft 10. The gear shaft 10 extends directly from motor 6 of actuator 4 such that motor 6 acts directly on gear shaft 10 causing it to rotate about the first axis 11. The gear shaft 10 connects to the shift rod 14 through a planetary gearset 35. In a depicted embodiment, the planetary gearset 35 is a three-stage planetary gearset having three sun gears 37a-37c providing input to each stage of the planetary gearset 35. Each sun gear 37a-37c transfers motion through respective planet gears 36a-36c to a respective carrier 38a-38c. The carrier 38a-38c at each stage acts to transfer the rotational motion to the next stage with carrier 38c transferring rotation to the shift rod 14. The planetary gearset 35 of FIG. 6 also includes a stationary annular gear (not shown) surrounding the planet gears 36a-36c. For example, the annular gear may be fixed to a housing surrounding the planetary gearset 35.

Specifically, in the configuration of FIG. 6, rotation of the gear shaft 10 causes rotation of sun gear 37a causing planet gears 36a to rotate. Planet gears 36a are fixed to carrier 38a, and thus rotation of sun gear 37a causes the planet gears 36a and the carrier 38a to rotate, or orbit, at sun gear 37a. The sun gear 37b of the second stage is fixed to the carrier 38a such that rotation of the carrier 38a rotates the sun gear 37b. Rotation of the sun gear 37b, in turn, causes rotation of planet gears 36b and carrier 38b. Rotation of carrier 38b causes rotation of the sun gear 37c of the third stage, which then causes rotation of planet gears 36c and carrier 38c. Carrier 38c is fixed to the shift rod 14, and thus transmits the rotational motion from the planet gears 36c of the third stage to the shift rod 14. As will be understood by one of ordinary skill in the art, the planetary gearset 35 depicted in FIG. 6 provides one example of a planetary gear configuration and other planetary gearset arrangements may be employed to effectively transmit rotation from the gear shaft 10 to the shift rod 14.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other assemblies. It is to be expected that various equivalents, alternatives and modifications are possible within the scope of the appended claims.

What is claimed is:

1. An outboard marine engine comprising:
   an internal combustion engine;
   a propulsor that is driven into rotation by the internal combustion engine so as to effect a thrust;
   a transmission that shifts amongst a forward gear wherein the thrust is a forward thrust, a reverse gear wherein the thrust is a reverse thrust, and a neutral gear wherein the thrust is a zero thrust;
   a shift rod that is rotatable about its own axis, wherein rotation of the shift rod about its own axis shifts the transmission amongst the forward gear, the reverse gear, and the neutral gear;
   an actuator operably connected to the internal combustion engine, wherein the actuator comprises a motor that rotates an output shaft;
   a first gearset connecting to the output shaft to a gear shaft such that rotation of the output shaft causes a gear shaft to rotate about its own axis, the first gearset comprising a first gear fixed to the output shaft that meshes with a second gear fixed to the gear shaft; and
   a second gearset connecting the gear shaft to the shift rod such that the rotation of the gear shaft about its own axis causes the rotation of the shift rod about its own axis, the second gearset comprising a third gear fixed to the gear shaft that meshes with a fourth gear fixed to the shift rod.

2. The outboard marine engine of claim 1, wherein the first gearset connecting the output shaft to the gear shaft is a parallel gearset.

3. The outboard marine engine of claim 1, wherein the third gear is a worm on the gear shaft that engages a sector gear fixed to the shift rod.

4. The outboard marine engine of claim 2, wherein the third gear and the fourth gear are parallel axis gears.

5. The outboard marine engine of claim 4, wherein the third gear is a spur gear and the fourth gear is a sector gear.

6. The outboard marine engine of claim 4, wherein the first gear, the second gear, the third gear, and the fourth gear are each one of a spur gear or a helical gear.

7. The outboard marine engine of claim 1, wherein at least one of the third gear and the fourth gear is a crossed-axis helical gear.

8. The outboard marine engine of claim 1, wherein the axis of the gear shaft is perpendicular to the axis of the shift rod.

9. The outboard marine engine of claim 1, wherein the axis of the gear shaft is parallel to the axis of the shift rod.

10. An outboard marine engine comprising:
    an internal combustion engine;
    a propulsor that is driven into rotation by the internal combustion engine so as to effect a thrust;
    a transmission that shifts amongst a forward gear wherein the thrust is a forward thrust, a reverse gear wherein the thrust is a reverse thrust, and a neutral gear wherein the thrust is a zero thrust;
    a shift rod that is rotatable about its own axis, wherein rotation of the shift rod about its own axis shifts the transmission amongst the forward gear, the reverse gear, and the neutral gear;
    an actuator operably connected to the internal combustion engine and causes a gear shaft to rotate about its own axis;
    at least one gearset connecting the gear shaft to the shift rod such that the rotation of the gear shaft about its own axis causes the rotation of the shift rod about its own axis;

wherein the actuator comprises a motor that acts directly on the gear shaft; and wherein the at least one gearset connecting the gear shaft to the shift rod includes a worm on the gear shaft that engages a sector gear fixed to the shift rod.

11. The outboard marine engine of claim 10, wherein the axis of the gear shaft is perpendicular to the axis of the shift rod.

12. The outboard marine engine of claim 10, wherein the axis of the gear shaft is parallel to the axis of the shift rod.

13. An outboard marine engine comprising:

an internal combustion engine;

a propulsor that is driven into rotation by the internal combustion engine so as to effect a thrust;

a transmission that shifts amongst a forward gear wherein the thrust is a forward thrust, a reverse gear wherein the thrust is a reverse thrust, and a neutral gear wherein the thrust is a zero thrust;

a shift rod that is rotatable about its own axis, wherein rotation of the shift rod about its own axis shifts the transmission amongst the forward gear, the reverse gear, and the neutral gear;

an actuator operably connected to the internal combustion engine and causes a gear shaft to rotate about its own axis;

at least one gearset connecting the gear shaft to the shift rod such that the rotation of the gear shaft about its own axis causes the rotation of the shift rod about its own axis;

wherein the actuator comprises a motor that acts directly on the gear shaft; and wherein the at least one gearset connecting the gear shaft to the shift rod is a planetary gearset.

* * * * *